A. E. CLARKE.
CABLE CONNECTION.
APPLICATION FILED APR. 15, 1920.

1,392,480.

Patented Oct. 4, 1921.

Inventor
Albert E. Clarke

UNITED STATES PATENT OFFICE.

ALBERT E. CLARKE, OF DETROIT, MICHIGAN.

CABLE CONNECTION.

1,392,480. Specification of Letters Patent. Patented Oct. 4, 1921.

Application filed April 15, 1920. Serial No. 374,163.

*To all whom it may concern:*

Be it known that I, ALBERT E. CLARKE, a citizen of the United States of America, residing at Detroit, in the county of Wayne and State of Michigan, have invented certain new and useful Improvements in Cable Connections, of which the following is a specification, reference being had therein to the accompanying drawings.

The invention relates to cable connections and has for its object, the provision of a construction which will securely grip the end of the cable and which may be readily assembled or disassembled. Other objects of the invention reside in the novel arrangements and combinations of parts as more fully hereinafter set forth.

Figure 1:
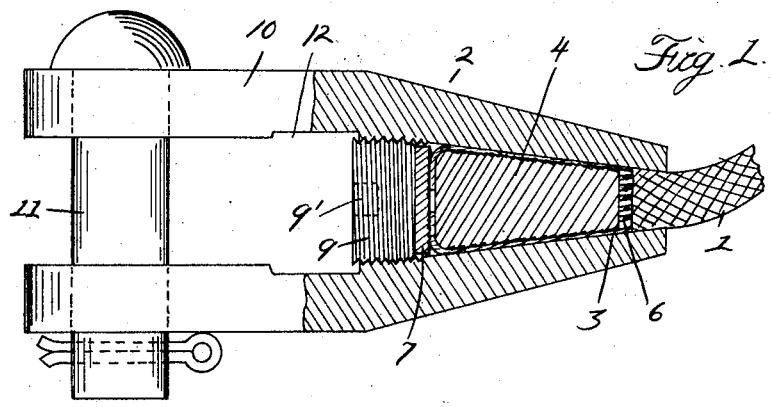
Figure 1 is a longitudinal central cross-section through a construction embodying my invention, partly in elevation.
Figure 2:
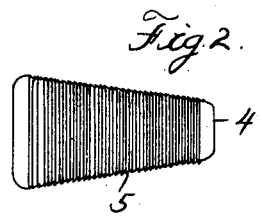
Fig. 2 is an elevation of one of the gripping members.
Figures 3, 4:
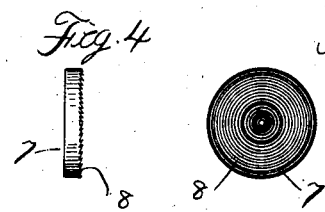
Fig. 3 is an end elevation of another gripping member.
Fig. 4 is a central cross-section through Fig. 3.

1 is a stranded cable and 2 is the body of the cable connection having the tapering passage-way 3 therein, the cross-sectional area of this passage-way being less at its outer end than at its inner end and being of a size to permit of the insertion of the cable 1 thereinto.

For the purpose of gripping the cable 1, the conical gripping member 4 is provided having its side wall tapering at substantially the same angle as the wall of the tapering passage-way 3. This conical gripping member is provided with rearwardly extending annular projections or teeth 5 which are adapted to slightly indent the strands 6 of the cable 1 which extend between the conical gripping member and the wall of the tapering passage-way 3 in the body. These strands are separated for a sufficient distance so that they will extend beyond the inner end of the conical gripping member 4 and lie adjacent thereto. 7 is another gripping member preferably in the form of a washer. The inner end of this washer has the series of concentric projections or teeth 8 which preferably incline radially inward. 9 is a suitable nut threadedly engaging the body 2 and adapted to abut the outer end of the washer 7 and force the teeth 8 thereof against and slightly into the strands 6, this nut is provided with a suitable polygonal recess 9' for engagement with a suitable wrench for rotating the nut.

In the form shown, the body 2 of the cable connection is provided with the pair of substantially parallel arms 10 through the outer ends of which a suitable clevis bolt 11 passes. The inner sides of these arms are provided with the recess 12 for permitting of the ready removal of the nut 8.

To secure a cable such as the stranded cable 1 to the cable connection, the strands 6 at one end of the cable are separated a distance such that their outer ends can be bent over the conical gripping member 4 and lie adjacent to its inner end. Preferably these strands are of a length such that when in assembled relation to the cable connection, the solid end of the cable 1 will extend slightly into the tapering passage-way 3 of the body 2 of the cable connection. The conical gripping member 4 is inserted into the tapering passage-way 3 so that the strands 6 surround the conical gripping member and extend longitudinally thereof and have their inner ends bent over the inner end of the conical gripping member. The gripping member 7 is then inserted after which the nut 9 is inserted and screwed against the outer end of the gripping member 7 which outer end is preferably plain to avoid too great friction. Inward screwing of the nut 9 thereby forces the conical gripping member 4 outward relative to the tapering passage-way 3 so that the strands 6 are gripped between the conical gripping member and the wall of the tapering passage-way. Any tension upon the cable 1 tending to pull the strands 6 out of the body 2 tends to force the conical gripping member 4 outward, due to the fact that the strands 6 are gripped by the rearwardly extending teeth 5 of the conical gripping member. Furthermore, the inner bent ends of these strands are more firmly gripped by the teeth 8 of the washer gripping member 7.

When it is desired to remove the cable 1 from the cable connection, this may be readily done by unscrewing the nut 9 and forcing the conical gripping member 4 and washer gripping member 7 rearwardly to disengage the same from the strands 6 after which the cable may be withdrawn.

When separating the strands at one end of the cable preparatory to assembling, a clamp is first applied around the cable at the desired distance from the end and then the strands are separated, after which the fiber center of the cable is cut off.

What I claim as my invention is:

1. The combination with a stranded cable, having the strands at one end separated, of a body having an outwardly tapering recess adapted to receive said strands, a conical gripping member having a series of annular rearwardly extending teeth thereon, said conical gripping member being insertible within said conical passage-way and surrounded by said separated strands, said strands extending longitudinally of said conical gripping member and having their outer ends bent over the inner end of said conical member and lying adjacent thereto, a washer gripping member having a series of concentric teeth engageable with the bent over ends of said strands, and a nut threadedly engaging said body and adapted to force said washer gripping member and conical gripping member outwardly relative to said conical passage-way.

2. The combination with a stranded cable having the strands at one end separated, of a body having an outwardly tapering recess adapted to receive said strands, a conical gripping member having a roughened peripheral surface and inserted within said outwardly tapering recess and surrounded by said separated strands, said strands extending longitudinally of said conical gripping member and having their outer ends bent over the inner end of said conical gripping member and lying adjacent thereto, and a second gripping member having a roughened surface engageable with the bent over ends of said strands, said second gripping member being detachably secured to said body.

3. The combination with a stranded cable having the strands at one end separated, of a body having an outwardly tapering recess adapted to receive said strands, a tapering gripping member inserted within said outwardly tapering recess and surrounded by said strands, said strands having their outer ends bent over the inner end of said tapering gripping member, a second gripping member engageable with the bent over ends of said strands, one of said gripping members having a roughened surface in engagement with the bent over ends, and means for forcing said gripping members into firm engagement with the bent over ends.

4. The combination with a stranded cable having the strands at one end separated, of a hollow body having substantially parallel anchoring arms at one end, said hollow body having a tapering passageway adapted to receive said strands, a tapering gripping member within said tapering passageway, and a nut threadedly engaging within said body and adapted to force said tapering gripping member outwardly relative to said tapering passageway, said substantially parallel arms being recessed at their inner sides for the insertion of said nut.

In testimony whereof I affix my signature.

ALBERT E. CLARKE.